O. BRIEDE.
FEEDING AND CUTTING MECHANISM.
APPLICATION FILED APR. 27, 1908.

984,887.

Patented Feb. 21, 1911.
2 SHEETS—SHEET 1.

WITNESSES:
J. Herbert Bradley.
Francis J. Tomasson

INVENTOR
Otto Briede,
by Christy & Christy
Atty's

O. BRIEDE.
FEEDING AND CUTTING MECHANISM.
APPLICATION FILED APR. 27, 1908.

984,887.

Patented Feb. 21, 1911.

2 SHEETS—SHEET 2.

WITNESSES:
J. Herbert Bradley.
Francis J. Tomasson

INVENTOR
Otto Briede,
by Christy & Christy
Atty's

UNITED STATES PATENT OFFICE.

OTTO BRIEDE, OF BENRATH, GERMANY.

FEEDING AND CUTTING MECHANISM.

984,887.

Specification of Letters Patent.  Patented Feb. 21, 1911.

Application filed April 27, 1908. Serial No. 429,430.

*To all whom it may concern:*

Be it known that I, OTTO BRIEDE, a citizen of the German Empire, residing at Benrath, Germany, have invented or discovered certain new and useful Improvements in Feeding and Cutting Mechanism, of which improvements the following is a specification.

It is generally characteristic of machines for forming bolts, rivets, screws, etc., that the feed mechanism is so constructed that the length of rod fed forward at each operation will vary in accordance with variations in the diameter of the rod, so that it is practically impossible to manufacture rivets having the same length or the same amount of metal in the head.

It is the further object of the invention described herein to provide for such a regulation of the movement of the rod with respect to the shears that all the blanks shall have the same length regardless of any variations in the length of the wire fed forward by the feed mechanism.

The invention is hereinafter more fully described and claimed.

Figure 1:
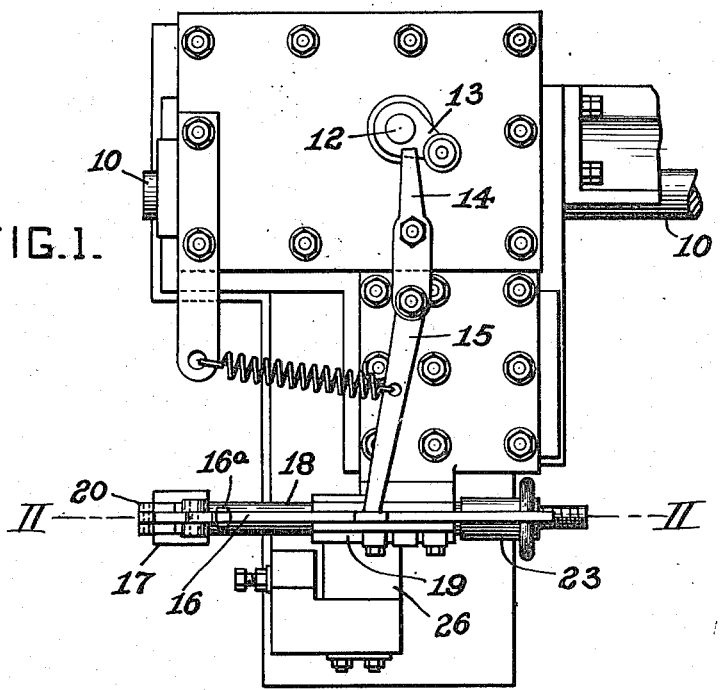
Figure 2:
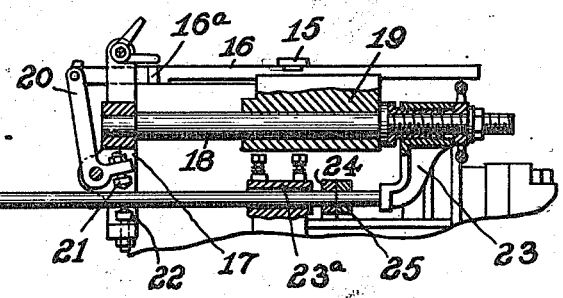
Figure 3:
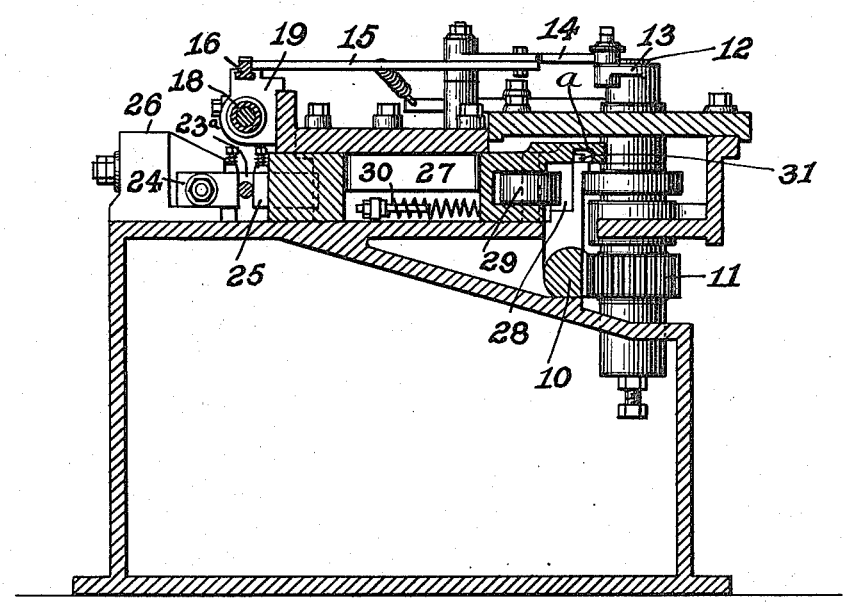
Figure 4:
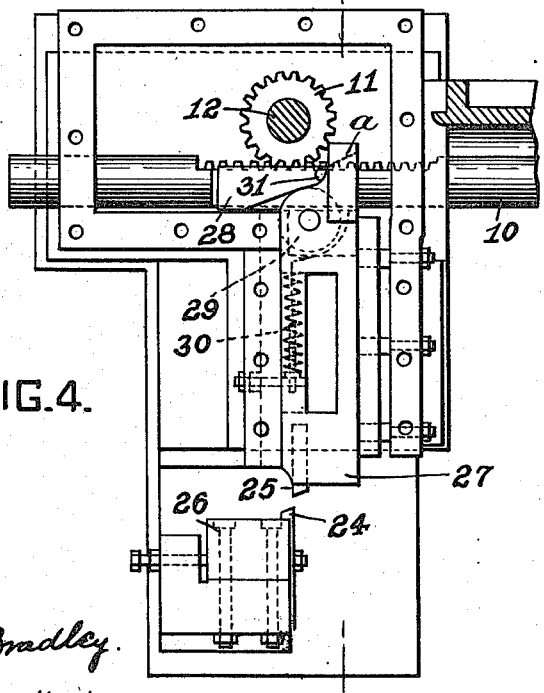

In the accompanying drawings forming a part of this specification, Figure 1 is a top plan view of my improved feed mechanism, Figs. 2 and 3 are sectional elevations in planes indicated by the lines II—II and III—III respectively in Fig. 1, and Fig. 4 is a plan view with the cap plate removed showing the operation of the shearing mechanism.

In the practice of my invention the mechanism for feeding the rod or wire may be operated in any suitable manner, such for example, as in the construction shown wherein a rack bar 10 is reciprocated by a suitable means, and engages a pinion 11 on a shaft 12. This shaft operates through suitable connections to reciprocate a slide 16. In the construction shown this shaft is provided at its upper end with a crank arm 13 provided with a pin adapted to engage a pivotally mounted arm 14. This arm is adjustably connected at one end to a lever 15 which is also mounted on the same pivotal pin as the arm 14. The outer end of this lever 15 is connected to a slide 16 so as to reciprocate the same to feed the rod or stock to the shearing mechanism.

A head 17 is secured to a bar 18 which is movably mounted in a suitable bearing or support 19, and on this head 17 is pivotally mounted a bell crank lever 20 having one end connected to slide 16 as shown, while its opposite end is provided with a point 21 adapted to engage one side of the bar to be fed. The opposite end of the rod-gripping means is formed by a point 22 adjustably secured in the head 17. By the movement of the slide 16 to the right the bell crank lever will be shifted so as to cause the rod to be gripped between the points 21 and 22, and on the further movement of the slide 16, the head 17 with the rod is moved in the same direction to feed in a suitable length of rod beyond the shearing blades. On the return movement of the slide 16 the rod is first freed from the grippers and the head is then shifted backward, a suitable distance by the slide 16 which is provided with a shoulder or projection 16$^a$ adapted to bear against the head 17 on the return movement of the slide.

On the sliding bar 18 is adjustably mounted a blank adjusting finger 23, said finger extending down into the plane of movement of the rod from which the rivets etc. are to be formed.

On the feed movement of the described mechanism, the rod is fed to the right, or past the shearing mechanism, a distance somewhat greater than the length of the blank to be cut, and on the return movement of the feed mechanism, the adjusting finger 23 carried by the sliding bar 18 will strike against the end of the rod and push it back until only a length equal to that required to form the rivet projects beyond the shear blades 24 and 25. In order to hold the stock in positions to which it is fed and adjusted a clamping device is employed, which has a top plate 23$^a$ yieldingly held by springs against the stock. The shear blade 24 is secured to a block 26 adjustably mounted on the frame of the machine. The movable blade 25 is secured to a slide 27 mounted in suitable ways on the bed of the machine, and adapted to be shifted to effect a shearing of the rod by means of a wedge-shaped projection 28 on the rack bar 10. While not necessary, it is preferred that this wedge should operate on the slide through a roller 29 carried by the slide 27. The return movement of the slide after a shearing operation is effected by a spring 30. It may sometimes happen that the shear blades become wedged together by metal forced between them, and the spring will not effect the return movement. To overcome this difficulty a pin 31 is so arranged upon the rack 10, that on the return movement of the bar 10 it will engage an inclined surface *a* of the slide 27, and shift the latter sufficiently far to separate the cutters.

It will be understood that as regards the broad terms of the claims, the invention is not limited to the specific construction shown and described, as many changes in the construction and mode of operation of many of the parts will readily suggest themselves to the skilled mechanic, without departing from the spirit of the invention described herein.

I claim herein as my invention:

1. A rod feeding mechanism having in combination a shearing mechanism, means for feeding a rod through and beyond the shearing mechanism a distance exceeding the desired length of blank to be formed, and means for moving the rod back through the shearing mechanism.

2. A rod feeding mechanism having in combination shearing mechanism, reciprocating mechanism for feeding the rod through and beyond the shearing mechanism, means for reciprocating such mechanism a distance exceeding the desired length of blank to be produced, and means connected to the feeding mechanism to move the rod back a desired distance.

3. A rod feeding mechanism having in combination a shearing mechanism, a slide relative to the shearing mechanism, means for reciprocating the slide a distance greater than the actual feed required, grippers adapted to engage the rod and carried by the reciprocating slide, and means for moving the rod back also connected to the slide.

4. A rod feeding mechanism having in combination a shearing mechanism, a reciprocating slide, means for moving the slide through a range of movement greater than the length of blank required, clamping jaws adapted to engage the rod or stock on the forward movement of the slide and to release the rod on the backward movement of the slide, and a gage finger secured to said slide and projecting into the path of movement of the rod.

5. A rod feeding mechanism having in combination a shearing mechanism, a reciprocating mechanism to feed the rod or stock relative to the shearing mechanism, and having a range of movement greater than the desired length of feed, means for moving the rod or stock in reverse direction and a frictional clamp to hold the rod or stock.

In testimony whereof, I have hereunto set my hand.

OTTO BRIEDE.

Witnesses:
 PETER LIEBER,
 WILHELM FLASCHE.